June 28, 1960     E. P. STEFL ET AL     2,943,010
COMPOSITE FABRIC AND METHOD OF MAKING THE SAME
Filed Aug. 12, 1955
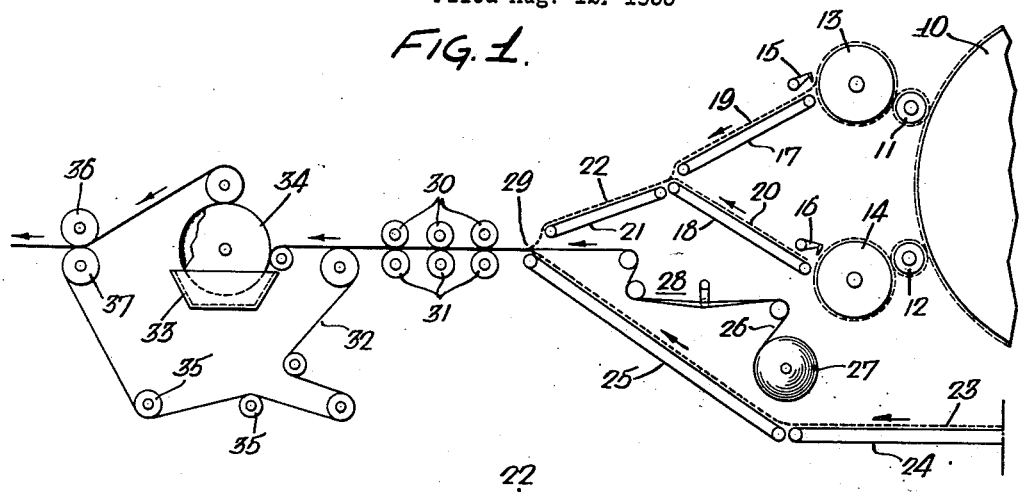
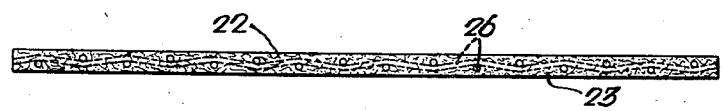
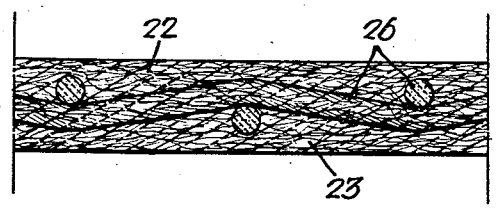
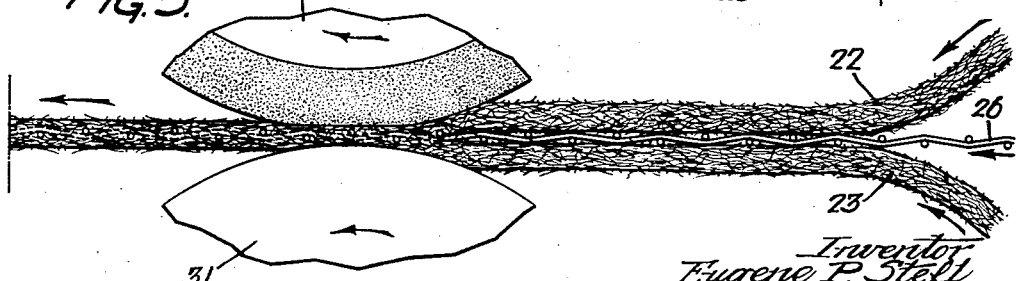
Inventor
Eugene P. Stefl
Thomas D. Coleman
by Howson & Howson Attys.

United States Patent Office 2,943,010
Patented June 28, 1960

2,943,010

COMPOSITE FABRIC AND METHOD OF MAKING THE SAME

Eugene P. Stefl, Lancaster, and Thomas D. Coleman, Manheim, Pa., assignors to Raybestos-Manhattan, Inc., Manheim, Pa., a corporation of New Jersey Filed Aug. 12, 1955, Ser. No. 528,058

9 Claims. (Cl. 154—127)

This invention relates to composite fabrics composed principally of open-mesh woven glass cloth and asbestos fibers.

It is well known, that materials composed of glass fibers, while having high tensile strength, are subject to disintegration by vibration or friction, and furthermore the heat resistance of such a material is limited by the melting point of the glass. It is also well known that while asbestos fibers have relatively low tensile strength, they have high heat and flame resistance and will withstand temperatures much higher than the melting temperature of glass. Proposals have been made in the past to provide a composite fabric in which open-mesh woven glass cloth is utilized to give high tensile strength, and in which asbestos fibers are utilized to protect the glass cloth and to give high heat resistance.

One prior proposal has been to form a structure composed of a center layer of glass cloth and thin asbestos paper on both sides of the glass cloth. The object is to cause the asbestos paper webs to contact each other through the meshes of the glass cloth by wetting the asbestos paper webs or by applying an adhesive to the confronting faces thereof, and then passing the assembly between pressure rolls. This method of forming a composite fabric leaves unfilled internal voids in the structure because it is practically impossible to cause the asbestos fibers to completely fill the meshes of the glass cloth. By reason of the internal voids, the structure tends to delaminate and blister when it is saturated with a binder and thereafter exposed to forced drying conditions.

Another prior proposal has been to apply a colloidal asbestos dispersion to the opposite sides of the glass cloth and to press the asbestos into the meshes of the cloth. While it is possible with this method to eliminate the undesirable voids of the first-mentioned method, it is impossible to produce a completely inorganic product. The reason for this is that this latter method requires use of an organic dispersing agent and an appreciable amount of such agent is retained in the product.

The principal object of the present invention is to overcome the objections of prior methods such as those above mentioned and to provide a superior composite fabric composed principally of open-mesh woven glass cloth and asbestos fibers.

Another object of the invention is to provide an improved laminated structure composed of a plurality of composite fabrics of the type here involved.

We have discovered that a partially or completely inorganic composite fabric substantially free of unfilled voids can be produced by applying dry carded spinning grade asbestos fibers to at least one side of an open-mesh woven glass cloth, and compressing the cloth and applied fibers to cause the fibers to enter and fill the meshes of the cloth and to effect interlocking of the asbestos fibers with one another and with the yarns of the glass cloth.

In the preferred practice of the invention, at least one dry carded asbestos web is brought into engagement with one side of an open-mesh woven glass cloth, and the interengaged glass cloth and asbestos web are then compressed by passing them through pressure rolls to cause the asbestos fibers to enter and fill the meshes of the cloth and to effect interlocking of the asbestos fibers with one another and with the yarns of the cloth. Usually it will be desired to apply asbestos fibers to both sides of the glass cloth, and therefore in usual practice two dry carded asbestos webs are brought into engagement with the opposite sides of the glass cloth, and the inter-engaged cloth and webs are then passed through the pressure rolls to effect filling of the cloth meshes by the fibers and interlocking of the opposed asbestos webs through the glass cloth as well as interlocking of the asbestos fibers with the yarns of the cloth. If desired, the dry composite fabric may then be wet with water or a sizing liquid and may be passed through pressure rolls to compact it further, after which it may be dried.

Further, in accordance with this invention, a laminated structure may be formed by individually impregnating a plurality of composite fabrics with suitable resin, then assembling the resin-impregnated fabrics as laminations, and then subjecting the assembly to heat and pressure to form the desired laminated product.

An important distinction of the present invention over the two prior methods hereinbefore mentioned is that only long asbestos fibers are obtained by the carding of asbestos to form the asbestos webs, and the use of long fibers results in good interlocking of the fibers with one another and with the glass cloth. In the prior process employing asbestos paper formed on conventional paper making equipment, only the shortest grades of asbestos fiber are used. In the other prior process employing a colloidal dispersion, short fibers inherently result from the process. In both prior processes, the short fibers do not give effective interlocking of the fibers with one another and with the glass cloth. Moreover in the case of asbestos paper, the fibers are pressed into a sheet and this further precludes interlocking of the fibers with one another and with the glass cloth. Because of this distinction, the product formed by the present process is far superior to those formed by the prior processes.

Reference is now made to the accompanying drawings, wherein:

Fig. 1 is a diagrammatic illustration of the preferred method according to this invention;

Fig. 2 is an enlarged face view of the composite fabric, with a portion broken away for the purpose of illustration;

Fig. 3 is an enlarged edge view of the fabric;

Fig. 4 is an enlarged sectional view taken on line 4—4 of Fig. 2; and

Fig. 5 is an enlarged illustration showing the manner in which the composite fabric is formed.

As previously stated, in usual practice of the invention, dry carded spinning grade asbestos fibers will be applied to both sides of an open-mesh woven glass cloth. Fig. 1 shows the manner in which this preferred practice may be carried out. The dry carded asbestos fibers are taken from the main card cylinder 10 by fancies 11 and 12 and are transferred to the doffers 13 and 14 to form a web on each doffer. The asbestos webs are removed from the doffers by vibrating combs 15 and 16 onto delivery aprons or conveyors 17 and 18, the webs being shown at 19 and 20. The conveyors 17 and 18 feed the webs onto a common apron or conveyor 21 to supply a web 22 of substantial thickness.

In similar manner, an asbestos web 23 of substantial thickness is produced, and this web is carried by aprons or conveyors 24 and 25.

An open-mesh woven glass cloth 26 is taken from roll 27 and is fed through spreader rolls and expanders illustrated generally at 28.

The glass cloth 26 and the asbestos webs 22 and 23 of dry carded asbestos fibers are brought together at 29 and are passed through pressure rolls 30 and 31. Rolls 30 may be rubber, while rolls 31 may be steel calender rolls. In passing between these rolls, the composite assembly is compressed, and the dry carded asbestos fibers are caused to fill the meshes of the glass cloth and to interlock with one another and with the yarns of the glass cloth. Fig. 5 shows more clearly how the webs 22 and 23 of dry carded asbestos fibers and the glass cloth 26 are brought together and passed between the pressure rolls 30 and 31 to effect the desired compression and to form the desired composite fabric.

While the composite fabric thus formed may be used without further treatment, it may be further treated in the manner shown in Fig. 1. From the pressure rolls 30 and 31, the composite fabric passes onto a woolen conveyor blanket 32 which conveys it through a dip tank 33 with which there is associated a screen cylinder 34. In the arrangement illustrated, the conveyor blanket 32 is continuous and is supported by various rolls designated generally by reference numeral 35 which carry the blanket to and from the screen cylinder 34. The tank 33 may contain water or it may contain a size such as starch or resin. In any case, the composite fabric is wet by its passage through the tank and is delivered to the pressure or calender rolls 36 and 37. These rolls further compress the composite fabric. After passing through these rolls, the composite fabric is dried, as by supplying it to dry cans.

As previously indicated, an important feature of this process is the use of dry carded spinning grade asbestos fibers to form the asbestos webs which are brought into engagement with the glass cloth. Although there is some orientation of the carded asbestos fibers due to the carding action, there is predominately a random disposition of the fibers in the webs, and this random disposition plays an important part in the intimate interlocking of the asbestos fibers with one another and with the yarns of the glass cloth during the dry compressing operation effected by the rolls 30 and 31. Furthermore, as previously pointed out, the relatively long length of the fibers also plays an important part in the interlocking effects achieved by the process.

It should be noted further that in this process the carded asbestos web is not smooth surfaced but has fibers extending perpendicular and otherwise angular to the plane of the web. This disposition of the fibers enables the interlocking to occur, rather than by squeezing the fibers into the meshes of the glass cloth as in the case of asbestos paper. By the present method it is possible to fill the meshes of the glass cloth evenly to the thickness of the cloth, with a minimum amount of fiber lying on the mesh, so that the resulting product is smooth surfaced and of uniform thickness.

Examples of the types of asbestos fibers which are suitable for use in this process are chrysotile, crocidolite or amosite. The length of the asbestos fibers employed may range from about ⅛" to 1½" or longer, the preferred average length being about ⅜".

By this method, it is possible to produce a composite fabric composed solely of glass cloth and asbestos fibers, such composite fabric being completely inorganic. It is also possible to produce a completely inorganic fabric employing a mixture of carded asbestos fibers and glass fibers. The glass fibers may range in length from 1½" to 3", the preferred length being 1½". It is also possible to produce a partially inorganic composite fabric containing various percentages of organic carrier fibers mixed with the asbestos fibers. In the case of a completely inorganic product, the longest asbestos fibers should be used, while in the case of a partially inorganic product, shorter asbestos fibers may be used with carrier fibers such as rayon, cotton, nylon, Dacron, Orlon, etc. Both natural and synthetic type carrier fibers may be used in the partially inorganic product. The length of such fibers may be as stated above with reference to glass fibers.

Where carrier fibers are employed, whether glass fibers or organic fibers, they may be blended with the asbestos during the carding operation. The carding operation involves passage through a breaker card and a finisher card, and the blending of the carrier fibers with the asbestos fibers may be performed during the initial pass through the breaker card, the final mat consisting of a combination of the fibers as it leaves the finisher card.

Glass cloth formed from various sizes of glass yarns may be used for the purpose of this invention. Some examples of the yarn sizes are size 150 of which there are 15,000 yards to the pound, size 225 of which there are 22,500 yards to the pound, and size 450 of which there are 45,000 yards to the pound. The preferred glass cloth is that formed from size 150 yarn.

A glass cloth construction of 20 yarns per inch in both warp and fill has been found very desirable. However, glass cloth employing a greater number of yarns per inch in both warp and fill can be used, provided that there is sufficient mesh area for the asbestos fibers to interlock through the meshes of the glass cloth. Composite fabrics have been made according to this invention with various weaves of glass cloth, one being a 20/20 mesh having a weight of 1.5 ounces per square yard and available in widths up to 52".

The ratio of asbestos fibers to glass in composite fabrics formed according to this invention may vary from about 30% to 70% by weight. Thus, in the case of the above-mentioned 20/20 mesh glass cloth, a composite fabric of about 30 to 50 parts by weight of glass and 50 to 70 parts by weight of asbestos can be produced.

Where a size is applied after dry calendering, as described above in connection with Fig. 1, the size may be starch. thermoplastic resins such as polyvinyl acetate, polyvinyl chloride, acrylates, or in some cases where desired a thermosetting type size of the phenolic type or such as silicones may be applied.

A composite fabric formed in accordance with this invention may be impregnated with suitable saturants to provide an ultimate sheet having a high tensile strength, high flexural strength, high impact resistance, and good heat resistance characteristics. With or without impregnation, the composite fabric produced by this invention has very high resistance to delamination or separation of the constituent parts by virtue of the high degree of interlocking of the asbestos fibers and the glass yarns. Because of its high resistance to delamination, the fabric may be processed by conventional impregnating techniques involving the use of coating rolls, dip rolls, or the like. In the case of an impregnated composite fabric, it is important to note that its resistance to delamination does not derive from the binder or resin impregnation, as in the case of some prior products, but from the intimate interlocking of the asbestos fibers and glass yarns.

A composite fabric according to this invention, when properly impregnated with a suitable varnish, pigmented or otherwise, can be utilized as an electrical insulating barrier and possesses advantages over an all-asbestos construction in that it has a much greater longitudinal and transverse tensile strength, and it also has a very high tear resistance. Composite fabrics according to this invention have been resinated with both thermoplastic and thermosetting saturants. Thermoplastic saturants such as polyvinyl acetate, polyvinyl chloride, natural rubber, synthetic rubbers, polytetrafluoroethylene, polymonochlorotrifluoroethylene are examples of saturants used.

Composite fabrics according to this invention have found application in laminates produced with thermosetting resins of the phenolic, epoxy and silicone types. The thermoplastic resinated composite fabric has merit as an electrical insulating belt in electrical cables. Representative characteristics of the material in this form in .010 gauge, compared to corresponding all-asbestos material, are as follows:

|  | Asbestos-Glass Composite Fabric | All-Asbestos |
|---|---|---|
| Resin Content_____percent__ | 45 | 45 |
| Tensile_____lbs. per 1″ width__ | 100 | 27 |
| Elemendorf Tear Test: | | |
| Longitudinal_____grams__ | 1600 | 160 |
| Transverse_____do__ | 1600 | 216 |

When converted into laminates, whether produced by low or high pressure techniques either in flat sheets or molded contour parts, improved flexural strength, compression and impact resistance is obtained.

Laminates made from the composite fabric have a marked resistance to crazing when subjected to high impact shock. To produce a laminate from such a material the composite fabric is impregnated with a typical resin such as phenolic by passing it through a dip tank over wiper bars and festooning in a vertical drying tower. The treated fabric with the desired volatile content is cut into the appropriate size and put in a press. For a phenolic laminate the layup is introduced into the hot platens of a press, pressed at 260° F. for ½ hr. and the laminates are pulled hot from the press. Pressing pressures can be varied from 40 p.s.i. to 1500 p.s.i. The press panels are postcured in a circulating air oven for 24 hrs. at 250° F., 24 hrs. at 300° F., and 24 hrs. at 350° F. A laminate so produced with 45% phenolic resin content in the conposite sheet pressed at 200 p.s.i. would possess the following properties, in comparison to an all-asbestos laminate.

|  | Asbestos-Glass Composite Fabric | All-Asbestos |
|---|---|---|
| Flexural Strength_____p.s.i__ | 46,600 | 35,200 |
| Modulus of Elasticity in Flexure_____ | 3.85x10⁶ | 3.09x10⁶ |
| Compressive Strength_____ | 24,750 | 20,300 |
| Modulus of Elasticity in Compression_____ | 2.39x10⁶ | 1.87x10⁶ |
| Izod Impact, Notched, ft. lbs/inch_____ | 10.9 | 2.7 |
| Specific Gravity_____ | 1.74 | 1.66 |
| Resin Content_____percent__ | 40-45 | 40-45 |

While the invention has been described with reference to specific examples, these have been given solely for the purpose of disclosure and are not intended to limit the invention. It will be understood, therefore, that the invention contemplates such modifications and further embodiments as may occur to those skilled in the art.

We claim:

1. A method of making a laminated fabric structure of high tensile and flexural strength, high resistance to delamination and impact, and high strength to weight ratio which comprises applying a web of dry carded spinning grade asbestos fibers having predominant random disposition and interlocked with one another to a plurality of open mesh glass cloths, compressing each glass cloth and associated web to cause said asbestos fibers to enter and fill the meshes of the cloth and to effect interlocking of the fibers with the yarns of the glass cloth, impregnating each composite fabric thus formed with resin, assembling the composite fabrics as laminations, and subjecting the assembly to heat and pressure to integrate the laminations and to cure the resin.

2. A laminated fabric structure characterized by high tensile and flexural strength, high resistance to delamination and impact, and high strength to weight ratio comprising a plurality of superimposed resin-impregnated laminations each lamination comprising an open mesh woven glass cloth and a superimposed web consisting principally of dry carded spinning grade asbestos fibers having predominant random disposition and interlocked with one another, said asbestos fibers filling the meshes of said glass cloth and being interlocked with the yarns of said cloth.

3. A laminated fabric structure according to claim 2 wherein said asbestos fibers have an average length of at least about ⅜ in.

4. A laminated fabric structure according to claim 2 wherein said resin comprises a thermosetting phenolic resin.

5. A laminated fabric structure according to claim 2 wherein said resin comprises a silicone resin.

6. A laminated fabric structure characterized by high tensile and flexural strength, high resistance to delamination and impact, and high strength to weight ratio comprising a plurality of superimposed resin-impregnated laminations each lamination comprising a plurality of superimposed webs consisting principally of dry carded spinning grade asbestos fibers having predominate random disposition and interlocked with one another and an open mesh woven glass cloth disposed between said webs, said asbestos fibers being interlocked with the yarns of said glass cloth and filling the meshes of said cloth.

7. A laminated fabric structure according to claim 6 wherein said asbestos fibers have an average length of at least about ⅜ in.

8. A laminated fabric structure according to claim 6 wherein said resin comprises a thermosetting phenolic resin.

9. A laminated fabric structure according to claim 6 wherein said resin comprises a silicone resin.

References Cited in the file of this patent

UNITED STATES PATENTS

| 292,037 | Nagel | Jan. 15, 1884 |
| 1,159,155 | Ayres | Nov. 2, 1915 |
| 1,503,337 | Seigle | July 29, 1924 |
| 2,401,314 | Quinn | June 4, 1946 |
| 2,454,218 | Schulman | Nov. 16, 1948 |
| 2,620,851 | Brown | Dec. 9, 1952 |

OTHER REFERENCES

"Matthews' Textile Fibers," by H. R. Mauersberger, pub. by J. Wiley & Sons, N.Y., copyright 1947 pages 918 and 913.